US012808022B2

(12) United States Patent
Oda et al.

(10) Patent No.: US 12,808,022 B2
(45) Date of Patent: Nov. 24, 2026

(54) GEAR

(71) Applicant: JATCO Ltd, Fuji (JP)

(72) Inventors: Toshihiro Oda, Yokohama (JP); Gou Katou, Atsugi (JP); Makoto Maeda, Hiratsuka (JP); Tomoya Tamai, Nagoya (JP); Kenta Tujii, Nagoya (JP); Shigeki Higuchi, Nagoya (JP)

(73) Assignee: JATCO Ltd, Fuji (JP)

( * ) Notice: Subject to any disclaimer, the term of this patent is extended or adjusted under 35 U.S.C. 154(b) by 166 days.

(21) Appl. No.: 18/856,689

(22) PCT Filed: Feb. 7, 2023

(86) PCT No.: PCT/JP2023/004009
§ 371 (c)(1),
(2) Date: Oct. 14, 2024

(87) PCT Pub. No.: WO2023/203838
PCT Pub. Date: Oct. 26, 2023

(65) Prior Publication Data

US 2025/0250661 A1 Aug. 7, 2025

(30) Foreign Application Priority Data

Apr. 18, 2022 (JP) ................................. 2022-068503

(51) Int. Cl.

| | |
|---|---|
| ***C22C 38/46*** | (2006.01) |
| ***C21D 1/18*** | (2006.01) |
| ***C21D 6/00*** | (2006.01) |
| ***C21D 9/32*** | (2006.01) |
| ***C22C 38/00*** | (2006.01) |
| ***C22C 38/02*** | (2006.01) |
| ***C22C 38/04*** | (2006.01) |
| ***C22C 38/42*** | (2006.01) |
| ***C22C 38/44*** | (2006.01) |
| ***C23C 8/26*** | (2006.01) |
| ***F16H 55/06*** | (2006.01) |

(52) U.S. Cl.
CPC ................ *C22C 38/46* (2013.01); *C21D 1/18* (2013.01); *C21D 6/004* (2013.01); *C21D 6/005* (2013.01); *C21D 6/008* (2013.01); *C21D 9/32* (2013.01); *C22C 38/002* (2013.01); *C22C 38/02* (2013.01); *C22C 38/04* (2013.01); *C22C 38/42* (2013.01); *C22C 38/44* (2013.01); *C23C 8/26* (2013.01); *F16H 55/06* (2013.01)

(58) Field of Classification Search
None
See application file for complete search history.

(56) References Cited

FOREIGN PATENT DOCUMENTS

| | | | |
|---|---|---|---|
| JP | 2009-079253 | A | 4/2009 |
| JP | 2013-227675 | A | 11/2013 |
| JP | 2016-125132 | A | 7/2016 |

*Primary Examiner* — Ramsey Zacharia
(74) *Attorney, Agent, or Firm* — Foley & Lardner LLP

(57) ABSTRACT

A gear is made of a steel having a composition containing, by mass %, C: 0.31% to 0.35%, Si: 0.30% or less, Mn: 0.20% to 0.80%, P: 0.030% or less, S: 0.030% or less, Cu: 0.35% or less, Ni: 0.25% or less, Cr: 1.00% to 1.40%, Mo: 0.95% to 1.10%, and V: 0.25% to 0.30%, and satisfying the following Formulas (1) and (2), with a balance being Fe and unavoidable impurities, and the gear includes a soft-nitrided surface layer and a compound layer having a thickness of 5 μm or more and mainly containing an iron nitride.

$$3.36\times[Cr]+13.7\times[Mo]+5.59\times[V]>15 \quad \text{Formula (1)}$$

$$1.00\times[C]-0.20\times[Cr]+0.20\times[Mo]+1.00\times[V]-0.26>0.2 \quad \text{Formula (2)}$$

3 Claims, 7 Drawing Sheets

QUENCHING

ANNEALING

GAS SOFT NITRIDING

GEAR

TECHNICAL FIELD

The present invention relates to a gear, and more particularly to a gear including a soft-nitrided surface layer.

BACKGROUND ART

For gears used in power transmission mechanisms in automobiles, steel is forged or cut into a desired shape, and then subjected to surface hardening heat treatments such as carburizing and quenching, carbonitriding and quenching, or nitriding (including nitriding in the narrow sense and soft nitriding), so as to improve mechanical properties such as wear resistance.

In recent years, gears are often used in environments where seizure is more likely to occur than before, such as at a higher rotation speed and an associated increase in slip velocity, so there is a particular demand for high seizure resistance.

PRIOR ART DOCUMENT

Patent Document

Patent Document 1: JP 2013-227675 A
Patent Document 2: JP 2016-125132 A

SUMMARY OF INVENTION

Problem to be Solved by the Invention

In order to improve seizure resistance, it is said to be effective to form a compound layer by nitriding on a sliding surface of the gear to prevent direct contact between metals (see, for example, Patent Documents 1 and 2 mentioned above). However, as compared with carburizing and carbonitriding, nitriding has a lower processing temperature (approximately 500 °C to 650 °C), and a shallower diffusion depth of nitrogen. In addition, a parent phase inside a diffusion layer softens at a nitriding temperature.

As a result, nitrided gears have a problem of being prone to case crushing (damage in which a surface hardened layer peels off over a wide range) and internal plastic deformation due to low internal strength.

In view of the above circumstances, an object of the present invention is to provide a gear having excellent seizure resistance and internal strength.

As a result of diligent study aimed at solving the above problem, the present inventors have obtained the following findings. (a) Secondary hardening by Mo and V is effective in suppressing softening of a parent phase during nitriding. (b) By taking into consideration an effect of each alloying element on formation of a compound layer in nitriding and on an effective case depth, and by properly balancing an amount of each alloying element added, it is possible to ensure excellent seizure resistance and internal strength.

The present invention was made based on these findings. The gist of the present invention is as follows.

[1] A gear made of a steel having a composition containing, by mass %, C: 0.31% to 0.35%, Si: 0.30% or less, Mn: 0.20% to 0.80%, P: 0.030% or less, S: 0.030% or less, Cu: 0.35% or less, Ni: 0.25% or less, Cr: 1.00% to 1.40%, Mo: 0.95% to 1.10%, and V: 0.25% to 0.30%, and satisfying the following Formulas (1) and (2), with a balance being Fe and unavoidable impurities, and the gear including a soft-nitrided surface layer and a compound layer having a thickness of 5 μm or more and mainly containing an iron nitride, $$3.36\times[Cr]+13.7\times[Mo]+5.59\times[V]>15 \qquad \text{Formula (1)}$$

$$1.00\times[C]-0.20\times[Cr]+0.20\times[Mo]+1.00\times[V]-0.26>0.2 \qquad \text{Formula (2)}$$

in which [ ] in Formulas (1) and (2) indicates a content by mass % of each of the elements.

[2] The gear according to [1], in which an effective case depth reaching a Vickers hardness of 500 HV is 0.25 mm or more.

DESCRIPTION OF EMBODIMENTS

Figure 1A:
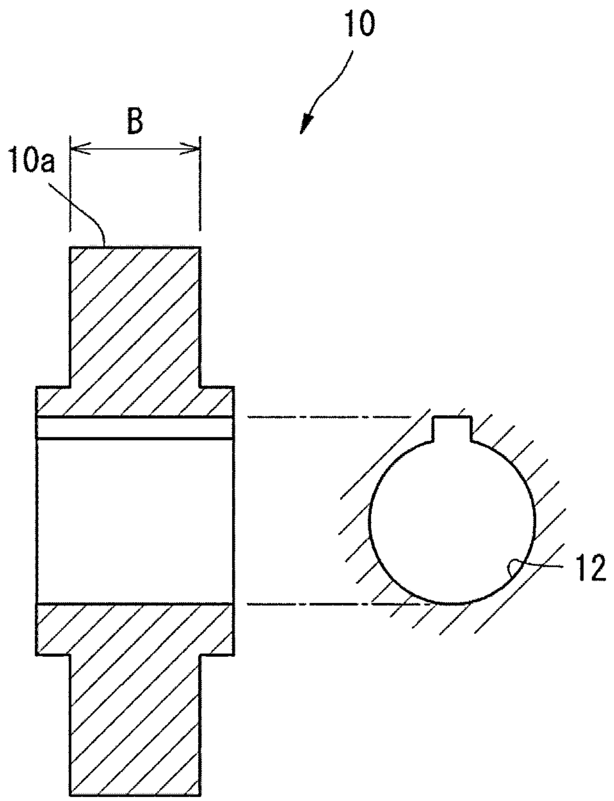
FIG. 1A is a diagram showing a shape of a roller used in a roller pitting test, and shows a test roller.

Next, a gear according to an embodiment of the present invention will be described in detail below.

The gear according to the present embodiment includes a soft-nitrided surface layer and is provided with a compound layer having a thickness of 5 μm or more.

The gear is made using a steel having a composition containing, by mass %, C: 0.31% to 0.35%, Si: 0.30% or less, Mn: 0.20% to 0.80%, P: 0.030% or less, S: 0.030% or less, Cu: 0.35% or less, Ni: 0.25% or less, Cr: 1.00% to 1.40%, Mo: 0.95% to 1.10%, and V: 0.25% to 0.30%, and satisfying the above Formulas (1) and (2), with a balance being Fe and unavoidable impurities.

Reasons for limiting the chemical components of the steel used for making the gear according to the present embodiment will be described in detail below. Note that in the following description, unless otherwise specified, "%" means "mass %".

C: 0.31% to 0.35%

C is an element necessary for ensuring hardness of a core of the gear. If the content of C is less than 0.31%, core strength becomes too low, resulting in a decrease in strength. On the other hand, if the content of C exceeds 0.35%, an amount of carbides becomes too large, and workability such as cutting performance will be deteriorated.

Si: 0.30% or Less

Si is added as a deoxidizer during melting. Since Si reduces hot workability and machinability of steel, an upper limit thereof is set as 0.30%. However, Si has an effect of increasing softening resistance, and may be added in an amount of 0.01% or more.

Mn: 0.20% to 0.80%

Mn is an element that is effective in increasing hardenability of steel. Mn also has effects of forming Mn-based sulfides and improving the machinability. In order to obtain these effects, a content of Mo needs to be 0.20% or more. On the other hand, excessive addition of Mn will increase hardness of steel and reduce the hot workability, and therefore an upper limit thereof is set as 0.80%. A preferred range of the content of Mn is 0.20% to 0.60%.

P: 0.030% or Less

P is an impurity and a content thereof is preferably small. P segregates at grain boundaries and reduces the hot workability of steel, and therefore the content thereof is set to 0.030% or less. It is difficult to completely reduce the content of P to zero, and a practical lower limit thereof is 0.004%.

S: 0.030% or Less

S is an impurity and a content thereof is preferably small. S is likely to combine with Mn to form coarse MnS, which reduces bending fatigue strength and the hot workability of steel, and therefore the content thereof is set to 0.030% or less. It is difficult to completely reduce the content of S to zero, and a practical lower limit thereof is 0.001%.

Cu: 0.35% or Less

Cu suppresses formation of carbides. For this reason, it is necessary to take into consideration balance with Cr and other elements that promote the formation of carbides. Since excessive addition of Cu leads to a decrease in hot forgeability and an increase in a material cost, a content of Cu is set to 0.35% or less. However, Cu may be added in an amount of 0.01% or more in order to improve the strength of the gear as a solid solution strengthening element.

Ni: 0.25% or Less

Ni, like Cu, suppresses the formation of carbides. For this reason, it is necessary to take into consideration balance with Cr and other elements that promote the formation of carbides. Since excessive addition of Ni leads to a decrease in the cutting performance and an increase in the material cost, a content of Ni is set to 0.25% or less. However, Ni may be added in an amount of 0.01% or more in order to improve the strength of the gear as a solid solution strengthening element.

Cr: 1.00% to 1.40%

Cr forms fine nitrides (CrN) in the hardened layer during soft nitriding, which improves hardness of the surface layer. In order to obtain this effect, a content of Cr is set to 1.00% or more. However, since excessive addition increases the material cost, an upper limit thereof is set to 1.40%. A preferred range of the content of Cr is 1.10% to 1.30%.

Mo: 0.95% to 1.10%

Mo has an effect of suppressing a decrease in parent phase hardness (internal hardness) during soft nitriding by precipitating carbides through secondary hardening, and is an effective element for ensuring an effective case depth. In order to obtain this effect, a content of Mo is set to 0.95% or more. However, since excessive addition increases the material cost, an upper limit thereof is set to 1.10%. A preferred range of the content of Mo is 0.95% to 1.00%.

V: 0.25% to 0.30%

Like Mo, V is an element that has the effect of suppressing the decrease in the parent phase hardness during soft nitriding by precipitating carbides through secondary hardening. In order to obtain this effect, a content of V is set to 0.25% or more. However, since excessive addition increases the material cost, an upper limit thereof is set to 0.30%.

$$3.36\times[Cr]+13.7\times[Mo]+5.59\times[V]>15 \quad \text{Formula (1)}$$

A left side of Formula (1) is an index relating to a thickness of a compound layer. Cr, Mo, and V are nitride-forming elements and are effective in stably forming the compound layer. By adjusting the components so that a value of the left side of Formula (1) exceeds 15, a thickness of 5 μm or more of the compound layer can be ensured in the soft nitriding.

$$1.00\times[C]-0.20\times[Cr]+0.20\times[Mo]+1.00\times[V]-0.26>0.2 \quad \text{Formula (2)}$$

A left side of Formula (2) is an index relating to the effective case depth. C, Mo, and V contribute to secondary hardening for precipitating carbides at a soft nitriding temperature (500 °C to 650 °C), and increase the effective case depth. On the other hand, Cr suppresses diffusion of nitrogen during the soft nitriding, thereby reducing the effective case depth. By adjusting the components so that a value of the left side of Formula (2) exceeds 0.2, it is possible to ensure that the effective case depth reaching a Vickers hardness of 500 HV in the soft-nitrided gear is 0.25 mm or more.

Compound Layer Thickness: 5 μm or More

The compound layer is a layer that mainly contains an iron nitride. The compound layer formed on a surface of the gear can effectively suppress seizure on a sliding surface. The thickness of the compound layer in the gear is set to 5 μm or more, in consideration of reduction due to wear. The thickness of the compound layer is more preferably 10 μm or more. However, if the compound layer is too thick, the compound layer is likely to become a starting point of bending fatigue fracture, and therefore an upper limit of the thickness of the compound layer is preferably set to 25 μm.

Effective Case Depth Reaching Vickers Hardness of 500 HV: 0.25 mm or More

When hardness distribution from the surface of the gear toward an inside thereof is measured, a depth from the surface of the gear having a Vickers hardness of 500 HV is called the effective case depth. The shallower the effective case depth, the greater the possibility of internal fracture. According to research by the present inventors, by ensuring the effective case depth of 0.25 mm or more, damage (such as case crush) starting from an inside of the soft-nitrided layer including the compound layer and a diffusion layer can be effectively suppressed.

The gear according to the present embodiment can be manufactured by steps of machining (rough machining) the steel having the above composition into a predetermined shape, quenching and annealing, finishing (fine machining) of the sliding surface and the like, and furthermore, gas soft nitriding.

In the quenching step, an intermediate member that is machined into a predetermined shape is held at a quenching temperature of 850 °C to 950 °C. A holding time at the quenching temperature is not particularly limited, and is, for example, 30 minutes to 60 minutes. After maintaining the heating for a predetermined time, the intermediate member is rapidly cooled to a temperature equal to or lower than a martensitic transformation start temperature Ms. A quenching medium is, for example, water or oil. The intermediate member after quenching is subjected to a known annealing step. An annealing temperature is, for example, 550 °C to 650 °C. A holding time at the annealing temperature is, for example, 60 minutes to 120 minutes.

In the gas soft nitriding step, by heating the intermediate member to a temperature equal to or lower than an A1 transformation point in an atmosphere containing $NH_3$, nitrogen and carbon are infiltrated into a surface of the intermediate member, and the surface layer is hardened by formation of a solid solution of nitrogen or precipitation of fine carbonitrides. As a result, a soft-nitrided layer is formed on the surface layer of the intermediate member, which is constituted by the compound layer containing mainly an iron nitride and the diffusion layer formed directly below the compound layer in which nitrogen is diffused into a matrix.

In gas soft nitriding, the treatment is carried out using a mixed gas of ($NH_3$+$CO_2$+$N_2$). Nitriding conditions can be appropriately adjusted. If a nitriding temperature is too low, a diffusion rate of nitrogen decreases, resulting in a long treatment time. On the other hand, if the nitriding temperature is too high, softening of the parent phase progresses, resulting in a decrease in the internal hardness. The nitriding temperature may be, for example, 500 °C to 650 °C.

The nitriding can be determined in conjunction with the nitriding temperature to obtain a desired thickness of the compound layer and a desired effective case depth. The nitriding temperature may be, for example, 2 hours to 5 hours.

Note that after the gas soft nitriding, the gear may be subjected to a lubricating coating treatment or the like as required.

EXAMPLES

Next, effects of one embodiment of the present invention will be described more specifically with reference to Examples. Here, for 24 kinds of Examples and 5 kinds of Comparative Examples shown in Table 1 below, the thickness of the compound layer, the effective case depth, seizure resistance and the internal strength were evaluated using test pieces (test rollers and load rollers) manufactured through the steps of melting and casting, rolling, rough machining, quenching and annealing, fine machining, and gas soft nitriding.

Production of Test Pieces

Figure 1B:
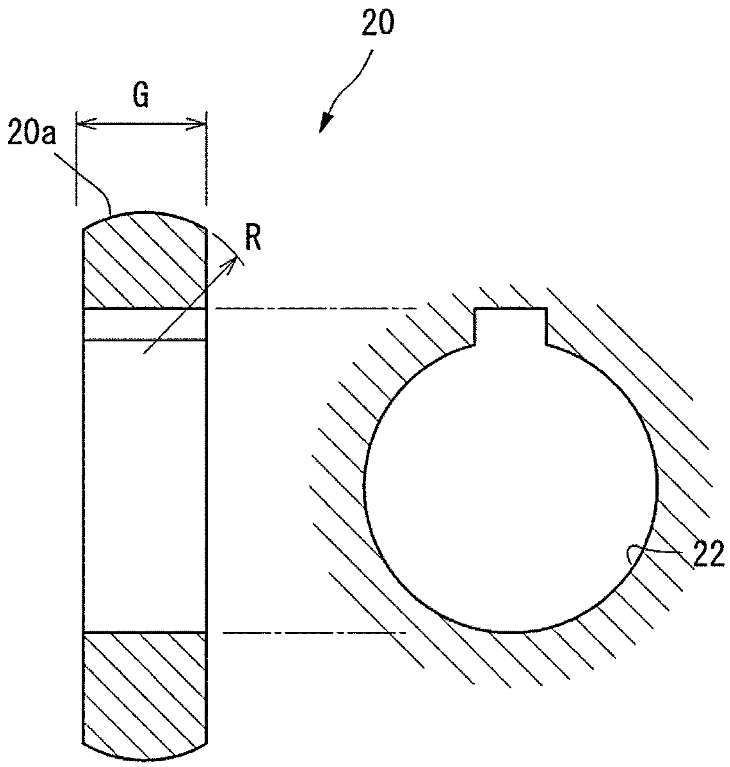
FIG. 1B is a diagram showing a shape of a roller used in the roller pitting test, and shows a load roller.

A 150 kg steel ingot having a predetermined chemical composition was melted in a vacuum induction melting furnace and cast into an ingot. Next, this ingot was rolled into a bar material, and the bar material was then cut to prepare a test roller 10 shown in FIG. 1A and a load roller 20 shown in FIG. 1B by rough machining (mechanical working). Note that a dimension B of the test roller 10 shown in FIG. 1A is 28 mm, and reference numeral 12 in the drawing denotes a through hole that engages with a separate shaft body. A dimension G of the load roller 20 shown in FIG. 1B is 18 mm and a dimension R thereof is 700 mm, and reference numeral 22 in the drawing denotes a through hole that engages with a separate shaft body.

TABLE 1

| | | Chemical composition (mass %) (Balance Fe) | | | | | | | | | | Formula (1) | Formula (2) |
|---|---|---|---|---|---|---|---|---|---|---|---|---|---|
| | | C | Si | Mn | P | S | Cu | Ni | Cr | Mo | V | left side | left side |
| Examples | 1 | 0.34 | 0.06 | 0.33 | 0.005 | 0.003 | 0.07 | 0.04 | 1.23 | 0.96 | 0.26 | 18.7 | 0.29 |
| | 2 | 0.31 | 0.28 | 0.48 | 0.019 | 0.021 | 0.21 | 0.25 | 1.32 | 0.96 | 0.28 | 19.2 | 0.26 |
| | 3 | 0.35 | 0.27 | 0.32 | 0.029 | 0.023 | 0.07 | 0.23 | 1.33 | 1.05 | 0.27 | 20.4 | 0.30 |
| | 4 | 0.32 | 0.01 | 0.62 | 0.009 | 0.026 | 0.23 | 0.18 | 1.16 | 1.03 | 0.28 | 19.6 | 0.31 |
| | 5 | 0.33 | 0.30 | 0.50 | 0.006 | 0.024 | 0.05 | 0.25 | 1.16 | 1.04 | 0.27 | 19.7 | 0.32 |
| | 6 | 0.34 | 0.05 | 0.20 | 0.023 | 0.014 | 0.26 | 0.06 | 1.13 | 0.96 | 0.27 | 18.5 | 0.32 |
| | 7 | 0.34 | 0.08 | 0.80 | 0.007 | 0.017 | 0.25 | 0.07 | 1.19 | 1.09 | 0.27 | 20.4 | 0.33 |
| | 8 | 0.34 | 0.13 | 0.39 | 0.030 | 0.024 | 0.12 | 0.24 | 1.10 | 1.01 | 0.29 | 19.2 | 0.35 |
| | 9 | 0.32 | 0.27 | 0.57 | 0.024 | 0.030 | 0.32 | 0.18 | 1.07 | 0.98 | 0.26 | 18.5 | 0.30 |
| | 10 | 0.33 | 0.27 | 0.72 | 0.029 | 0.016 | 0.01 | 0.24 | 1.05 | 0.99 | 0.29 | 18.7 | 0.35 |
| | 11 | 0.33 | 0.26 | 0.30 | 0.028 | 0.007 | 0.35 | 0.18 | 1.01 | 1.03 | 0.27 | 19.0 | 0.34 |
| | 12 | 0.34 | 0.27 | 0.69 | 0.006 | 0.015 | 0.09 | 0.01 | 1.23 | 1.06 | 0.28 | 20.2 | 0.33 |
| | 13 | 0.32 | 0.17 | 0.33 | 0.007 | 0.011 | 0.27 | 0.25 | 1.37 | 1.09 | 0.27 | 21.0 | 0.27 |
| | 14 | 0.33 | 0.17 | 0.70 | 0.030 | 0.026 | 0.21 | 0.21 | 1.00 | 0.96 | 0.27 | 18.0 | 0.33 |
| | 15 | 0.32 | 0.29 | 0.79 | 0.007 | 0.028 | 0.33 | 0.23 | 1.40 | 0.97 | 0.29 | 19.6 | 0.26 |
| | 16 | 0.33 | 0.17 | 0.68 | 0.020 | 0.026 | 0.30 | 0.17 | 1.24 | 0.95 | 0.27 | 18.7 | 0.28 |
| | 17 | 0.32 | 0.08 | 0.45 | 0.028 | 0.029 | 0.10 | 0.23 | 1.08 | 1.10 | 0.27 | 20.2 | 0.33 |
| | 18 | 0.34 | 0.16 | 0.56 | 0.014 | 0.023 | 0.23 | 0.06 | 1.19 | 1.01 | 0.25 | 19.2 | 0.29 |
| | 19 | 0.33 | 0.24 | 0.58 | 0.008 | 0.013 | 0.08 | 0.16 | 1.03 | 1.01 | 0.30 | 19.0 | 0.37 |
| | 20 | 0.33 | 0.18 | 0.75 | 0.015 | 0.005 | 0.32 | 0.16 | 1.20 | 0.96 | 0.27 | 18.7 | 0.29 |
| | 21 | 0.34 | 0.18 | 0.42 | 0.015 | 0.011 | 0.33 | 0.15 | 1.36 | 1.05 | 0.27 | 20.5 | 0.29 |
| | 22 | 0.34 | 0.27 | 0.68 | 0.012 | 0.005 | 0.32 | 0.10 | 1.15 | 1.07 | 0.28 | 20.1 | 0.34 |
| | 23 | 0.34 | 0.05 | 0.50 | 0.022 | 0.028 | 0.19 | 0.14 | 1.00 | 0.95 | 0.25 | 17.8 | 0.32 |
| | 24 | 0.31 | 0.27 | 0.39 | 0.020 | 0.025 | 0.21 | 0.16 | 1.40 | 0.95 | 0.25 | 19.1 | 0.21 |
| Comparative Examples | 1 | 0.21 | 0.32 | 0.87 | 0.019 | 0.016 | 0.18 | 0.07 | 1.18 | 0.03 | 0.00 | 4.4 | −0.28 |
| | 2 | 0.21 | 0.32 | 0.87 | 0.019 | 0.016 | 0.18 | 0.07 | 1.18 | 0.03 | 0.00 | 4.4 | −0.28 |
| | 3 | 0.20 | 0.20 | 0.50 | 0.015 | 0.015 | 0.15 | 0.10 | 1.10 | 1.00 | 0.27 | 18.9 | 0.19 |
| | 4 | 0.33 | 0.15 | 0.50 | 0.015 | 0.015 | 0.15 | 0.10 | 1.20 | 0.15 | 0.27 | 7.6 | 0.13 |
| | 5 | 0.33 | 0.15 | 0.50 | 0.015 | 0.015 | 0.15 | 0.10 | 1.20 | 1.00 | 0.05 | 18.0 | 0.08 |

Figure 2A:
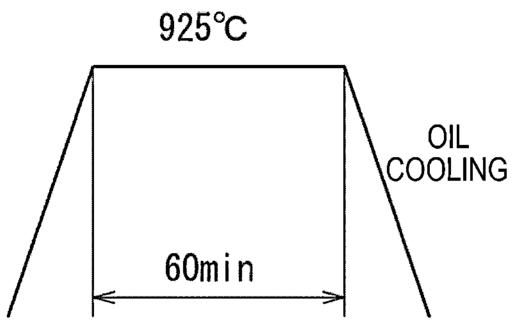
FIG. 2A is an explanatory diagram showing quenching in an embodiment.
Figure 2B:
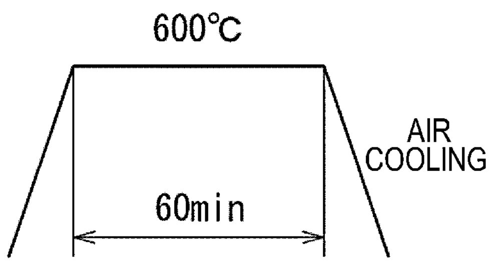
FIG. 2B is an explanatory diagram showing annealing in the embodiment.

Next, the test roller 10 and the load roller 20 were subjected to quenching and annealing according to a heat pattern shown in FIGS. 2A and 2B. Thereafter, lapping was performed so that a surface roughness Ra of a rolling surface 10*a* of the roller 10 is 0.1±0.05 μm, and a surface roughness Rz of a rolling surface 20*a* of the roller 20 is 1.6±0.5 μm.

Gas Soft Nitriding

Figure 2C:
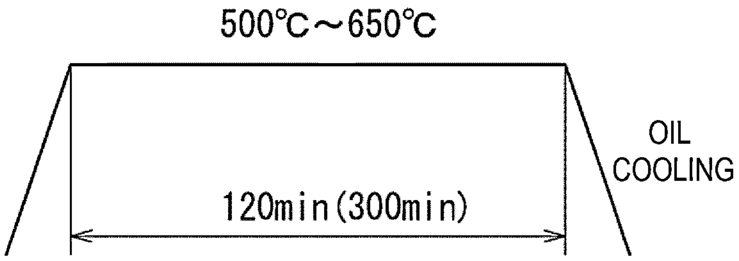
FIG. 2C is an explanatory diagram showing gas soft nitriding in the embodiment.

The test roller 10 and the load roller 20 produced as described above were subjected to gas soft nitriding to form a soft-nitrided surface layer on each. The gas soft nitriding was performed using a gas soft nitriding furnace and a mixed gas of ($NH_3$+$CO_2$+$N_2$) according to a heat pattern shown in FIG. 2C. Specific treatment temperature and treatment time are as shown in Table 2 below.

Figure 4A:
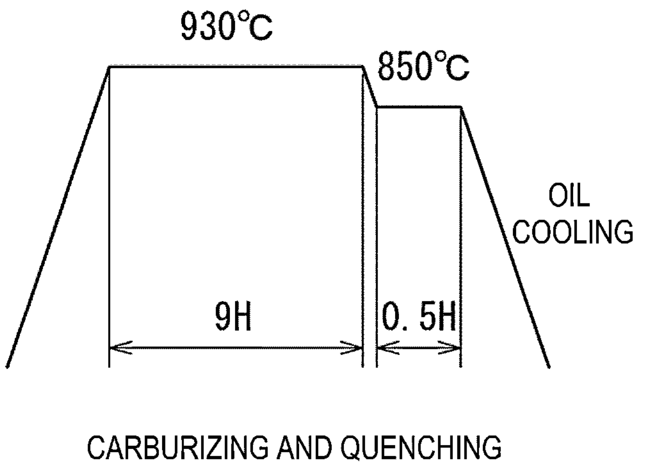
FIG. 4A is an explanatory diagram of carburizing and quenching applied to Comparative Example 2.
Figure 4B:
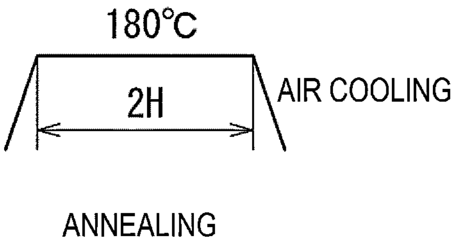
FIG. 4B is an explanatory diagram of annealing applied to Comparative Example 2.

However, in Comparative Example 2, vacuum carburizing was performed instead of the gas soft nitriding. A heat pattern under this case is shown in FIGS. 4A and 4B.

Measurement of Thickness of Compound Layer

A portion of the test roller 10 including the rolling surface 10*a* was cut, and a cross section perpendicular to the rolling surface 10*a* was polished and etched, and then observed under an optical microscope to measure the thickness of the compound layer. The etching was performed with a 3% Nital solution for 20 seconds to 30 seconds. The compound layer is observed as a white unetched layer. From 5 fields of view of a structure image photographed with an optical microscope at 1000 times, 3 locations of the compound layer were extracted at an interval of 20 μm, and thicknesses of the three locations were measured. An average of the measured values thus obtained at 15 locations was taken as the thickness of the compound layer, and results are shown in Table 2 below.

Measurement of Effective Case Depth

The Vickers hardness (HV) was measured in accordance with a Vickers hardness test method specified in "JIS Z2244", and a micro Vickers hardness tester was used. A diamond square pyramid indenter with a facing angle of 136° as specified in "JIS B7725" is used, and an indentation is made on a specified mirror-polished surface of each test piece with a test load that is not destructive. The Vickers hardness was calculated using a diagonal length d [mm] of the indentation and a test load F [N] using the following equation.

$$HV = 0.189\times(F/d\wedge 2)$$

The effective case depth was obtained by performing, on a cut surface perpendicular to the rolling surface 10*a* of the test roller 10, hardness measurement under a load of 300 g at an interval of 100 μm in a depth direction starting from a position 100 μm deep from the surface (the rolling surface). From an approximate curve showing a relation between the depth from the surface and the Vickers hardness, the depth from the surface corresponding to 500 HV was determined as the effective case depth (ECD), and results are shown in Table 2.

Seizure Resistance Evaluation

The test roller 10 and the load roller 20 prepared above were attached to a roller pitting tester, and a roller pitting test was carried out to evaluate the seizure resistance.

Figure 3:
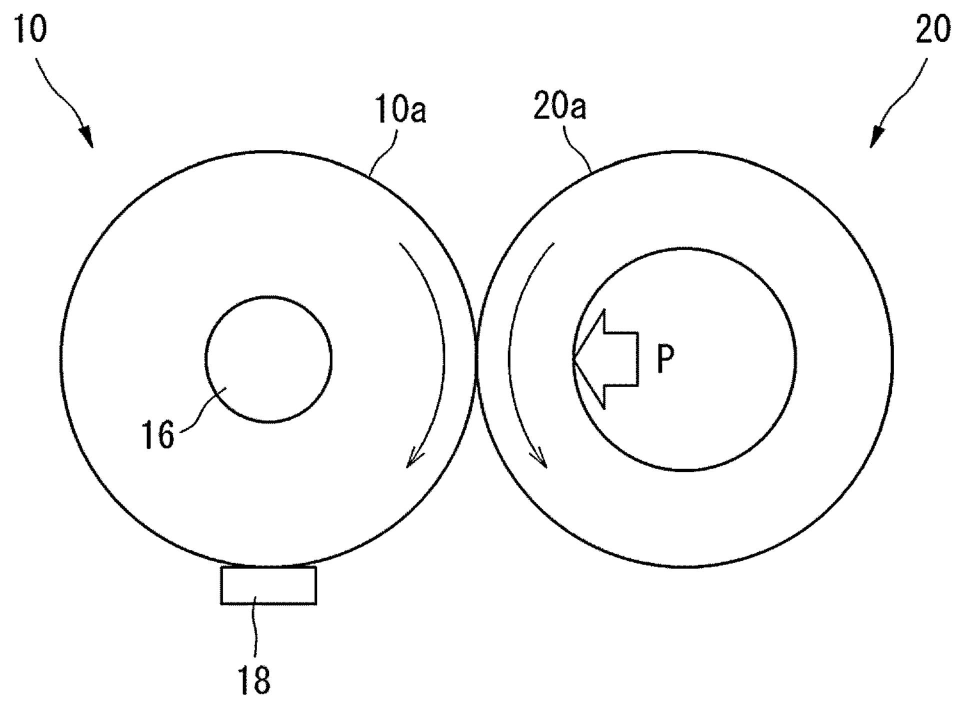
FIG. 3 is a schematic explanatory diagram of the roller pitting test.

FIG. 3 is a schematic diagram of the roller pitting test. As shown in the drawing, an outer periphery 20*a* of the load roller 20 was pressed against an outer periphery 10*a* of the test roller 10 with a load P, and both rollers were rotated while supplying a lubricant to a contact portion to check whether seizure occurs. Note that in the drawing, reference numeral 16 denotes a torque measuring instrument, and reference numeral 18 denotes a thermocouple for measuring a temperature of the rolling surface.

Specific test conditions are as follows.

Load P: 2 kN

Test roller rotation speed: 4000 rpm

Load roller rotation speed: 400 rpm

Lubricant temperature: 90 °C

Under the above test conditions, the test roller 10 was rotated for $1\times10^5$ cycles, and the presence or absence of seizure was checked. Specifically, a friction coefficient was calculated from a measured torque of the test roller 10 according to the following equation, and when the friction coefficient exceeds 0.08, it was determined that seizure occurs.

$$\text{Friction coefficient}=(\text{measured torque})/((\text{test load})\times(\text{roller radius}))$$

For the determination, a case where no seizure occurred within $1\times10^5$ cycles was marked as "A", and a case where seizure occurred was marked as "B", and results are shown in Table 2 below.

Internal Strength Evaluation

As in the seizure resistance evaluation, the test roller 10 and the load roller 20 prepared above were attached to the roller pitting tester, and a roller pitting test was carried out to evaluate the internal strength. Test conditions are as follows.

Load P: 18.8 kN

Test roller rotation speed: 1500 rpm

Load roller rotation speed: 1480 rpm

Lubricant temperature: 90 °C

Under the above test conditions, after the test roller 10 was rotated for $1\times10^5$ cycles, an amount of deformation (depression depth) in the depth direction of the rolling surface 10*a* was checked. A shape profile of the rolling surface 10*a* (unpeeled portion) was measured before and after the test, and a depth from an initial surface was defined as the depression depth. A shape profile in an axial direction of the rolling surface 10*a* was measured using a surface roughness measuring device (SURFACOM 1500SD-13, manufactured by Tokyo Seimitsu Co., Ltd.). In this case, a measurement length was set to 21 mm and a cutoff wavelength was set to 0.8 mm.

For the determination regarding the internal strength, a case where the depression depth was less than 10 μm was marked as "A", and a case where the depression depth was 10 μm or more was marked as "B", and results are shown in Table 2 below.

TABLE 2

| | | Heat treatment conditions | | | Compound layer | | | Internal strength | |
|---|---|---|---|---|---|---|---|---|---|
| | | Types | Temperature (° C.) | Time (h) | thickness (μm) | ECD (mm) | Seizure resistance | Depression depth (μm) | Determination |
| Examples | 1 | Gas soft nitriding | 600 | 2 | 18.2 | 0.30 | A | 2 | A |

TABLE 2-continued

| | | Heat treatment conditions | | | Compound layer | | | Internal strength | |
|---|---|---|---|---|---|---|---|---|---|
| | | Types | Temperature (° C.) | Time (h) | thickness (μm) | ECD (mm) | Seizure resistance | Depression depth (μm) | Determination |
| | 2 | Gas soft nitriding | 600 | 2 | 18.4 | 0.28 | A | 2 | A |
| | 3 | Gas soft nitriding | 600 | 2 | 18.4 | 0.32 | A | 4 | A |
| | 4 | Gas soft nitriding | 600 | 2 | 18.4 | 0.30 | A | 2 | A |
| | 5 | Gas soft nitriding | 600 | 2 | 18.4 | 0.30 | A | 3 | A |
| | 6 | Gas soft nitriding | 600 | 2 | 18.3 | 0.30 | A | 3 | A |
| | 7 | Gas soft nitriding | 600 | 2 | 19.1 | 0.30 | A | 3 | A |
| | 8 | Gas soft nitriding | 600 | 2 | 18.4 | 0.30 | A | 2 | A |
| | 9 | Gas soft nitriding | 600 | 2 | 18.4 | 0.30 | A | 4 | A |
| | 10 | Gas soft nitriding | 600 | 2 | 18.4 | 0.30 | A | 3 | A |
| | 11 | Gas soft nitriding | 600 | 2 | 18.4 | 0.30 | A | 3 | A |
| | 12 | Gas soft nitriding | 600 | 2 | 18.4 | 0.30 | A | 3 | A |
| | 13 | Gas soft nitriding | 600 | 2 | 18.4 | 0.30 | A | 2 | A |
| | 14 | Gas soft nitriding | 600 | 2 | 17.6 | 0.34 | A | 2 | A |
| | 15 | Gas soft nitriding | 600 | 2 | 20.5 | 0.26 | A | 3 | A |
| | 16 | Gas soft nitriding | 600 | 2 | 16.9 | 0.29 | A | 2 | A |
| | 17 | Gas soft nitriding | 600 | 2 | 21.4 | 0.32 | A | 2 | A |
| | 18 | Gas soft nitriding | 600 | 2 | 17.2 | 0.28 | A | 5 | A |
| | 19 | Gas soft nitriding | 600 | 2 | 19.4 | 0.33 | A | 4 | A |
| | 20 | Gas soft nitriding | 500 | 2 | 16.1 | 0.28 | A | 2 | A |
| | 21 | Gas soft nitriding | 650 | 2 | 20.3 | 0.31 | A | 3 | A |
| | 22 | Gas soft nitriding | 600 | 5 | 22.7 | 0.35 | A | 4 | A |
| | 23 | Gas soft nitriding | 600 | 2 | 18.0 | 0.25 | A | 5 | A |
| | 24 | Gas soft nitriding | 600 | 2 | 19.2 | 0.25 | A | 4 | A |
| Comparative Examples | 1 | Gas soft nitriding | 600 | 2 | 4 | 0.1 | B | 46 | B |
| | 2 | Vacuum carburizing | 930 | — | 0 | 0.7 | B | 2 | A |
| | 3 | Gas soft nitriding | 600 | 2 | 12 | 0.18 | A | 39 | B |
| | 4 | Gas soft nitriding | 600 | 2 | 4 | 0.22 | B | 36 | B |
| | 5 | Gas soft nitriding | 600 | 2 | 10 | 0.2 | A | 30 | B |

The evaluation results in Table 2 reveal the following.

In Comparative Example 1, a material equivalent to SCR420H, which has been used as a steel for soft-nitrided parts in the related art, was subjected to soft nitriding. In Comparative Steel 1, the contents of Mo and V are below the lower limits of the ranges specified in the present invention, and the requirements of Formulas (1) and (2) are not satisfied. For these reasons, the compound layer was not formed to the target thickness (5 μm or more), and the seizure resistance was evaluated as "B". The effective case depth (ECD) was as shallow as 0.1 mm, and the internal strength was evaluated as "B".

In Comparative Example 2, similarly to Comparative Example 1, a material equivalent to SCR420H was used, but vacuum carburizing was performed instead of soft nitriding. The effective case depth (ECD) was as deep as 0.7 mm, and the internal strength was evaluated as "A", but no compound layer was formed, and the seizure resistance was evaluated as "B".

In Comparative Example 3, the content of C is below the lower limit of the range specified in the present invention, and the requirement of Formula (2) is not satisfied. As a result, the effective case depth (ECD) was as shallow as 0.18 mm, and the internal strength was evaluated as "B".

In Comparative Example 4, the content of Mo is below the lower limit of the range specified in the present invention, and the requirements of Formulas (1) and (2) are not satisfied. For these reasons, the compound layer was not formed to the target thickness, and the seizure resistance was evaluated as "B". The effective case depth was as shallow as 0.22 mm, and the internal strength was evaluated as "B".

In Comparative Example 5, the content of V is below the lower limit of the range specified in the present invention, and the requirement of Formula (2) is not satisfied. As a result, the effective case depth was as shallow as 0.2 mm, and the internal strength was evaluated as "B".

Accordingly, in Comparative Examples 1 to 5, the seizure resistance and the internal strength were evaluated as "B".

In contrast, in Examples 1 to 24 in which the amount of each element added and the thickness of the compound layer fell within the ranges specified by the present invention, both the seizure resistance and the internal strength were evaluated as "A".

Therefore, it is presumed that a gear made of a steel having the composition of the present embodiment and provided with a compound layer having a thickness of 5 μm or more by soft nitriding will have excellent seizure resistance and will be able to effectively suppress damage such as case crashes caused by low internal strength.

Figure 5:
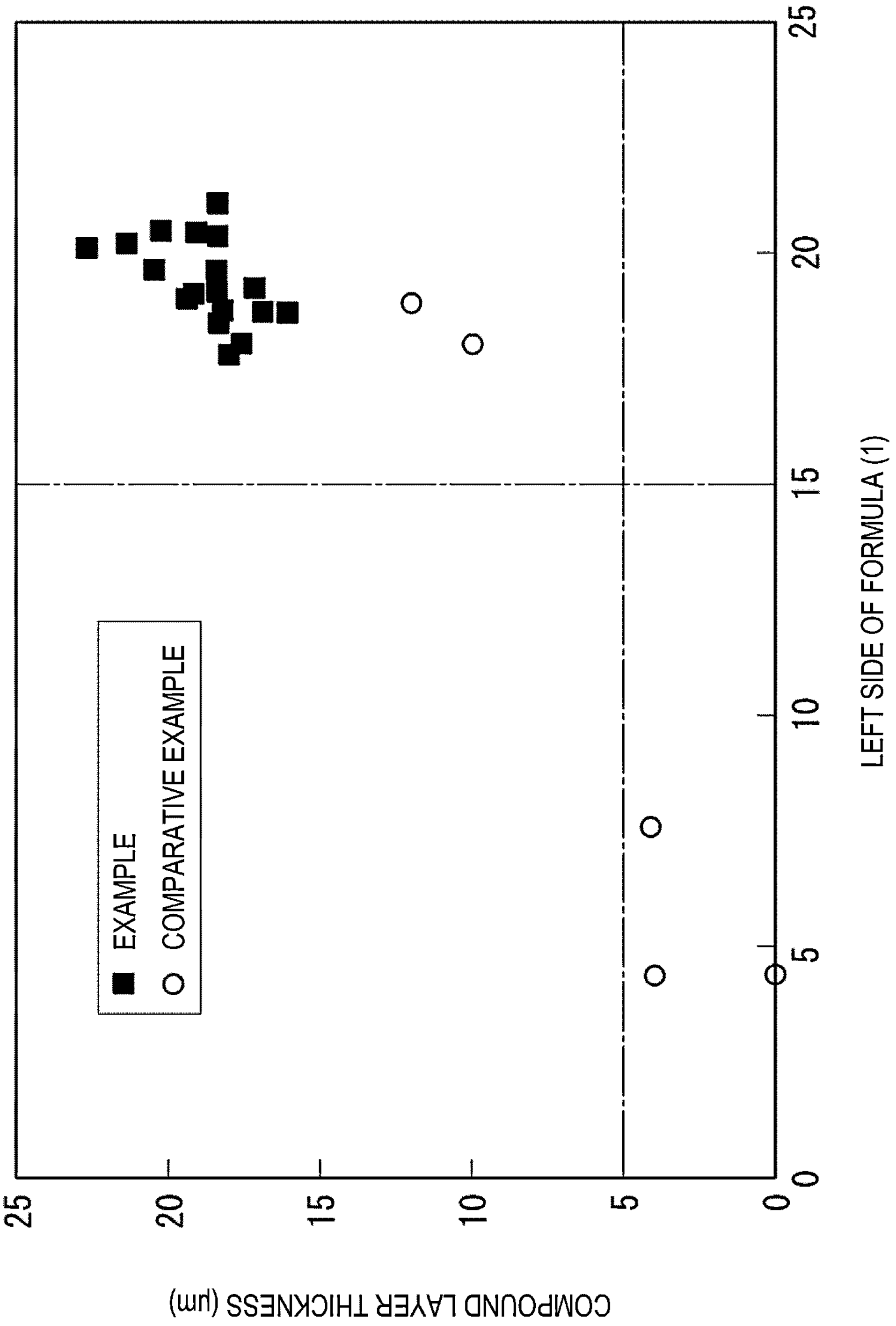
FIG. 5 is a graph showing a relation between an index for a compound layer expressed by a left side of Formula (1) and a measured thickness of the compound layer.

Note that FIG. 5 is a graph showing a relation between an index for the compound layer expressed by the left side of Formula (1) and a measured thickness of the compound layer. According to the graph, it can be seen that if the value of the left side of Formula (1) exceeds 15, a compound layer having a thickness of 5 μm or more can be ensured.

Figure 6:
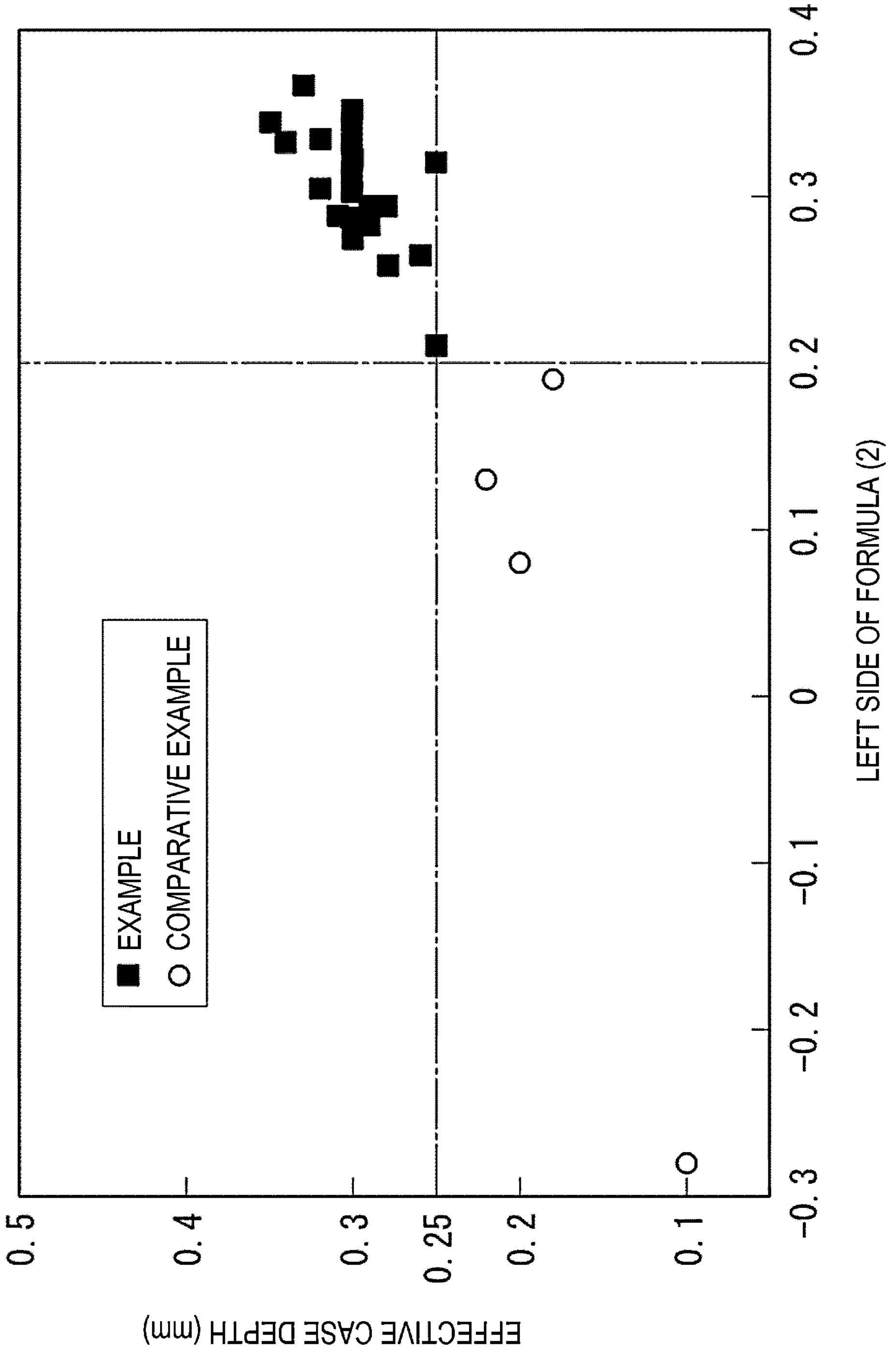
FIG. 6 is a graph showing a relation between an index for an effective case depth expressed by a left side of Formula (2) and a measured effective case depth.

FIG. 6 is a graph showing a relation between an index for the effective case depth expressed by the left side of Formula (2) and a measured effective case depth. It can be seen that if the value of the left side of Formula (2) exceeds 0.2, an effective case depth (500 HV) of 0.25 mm or more can be ensured.

Figure 7:
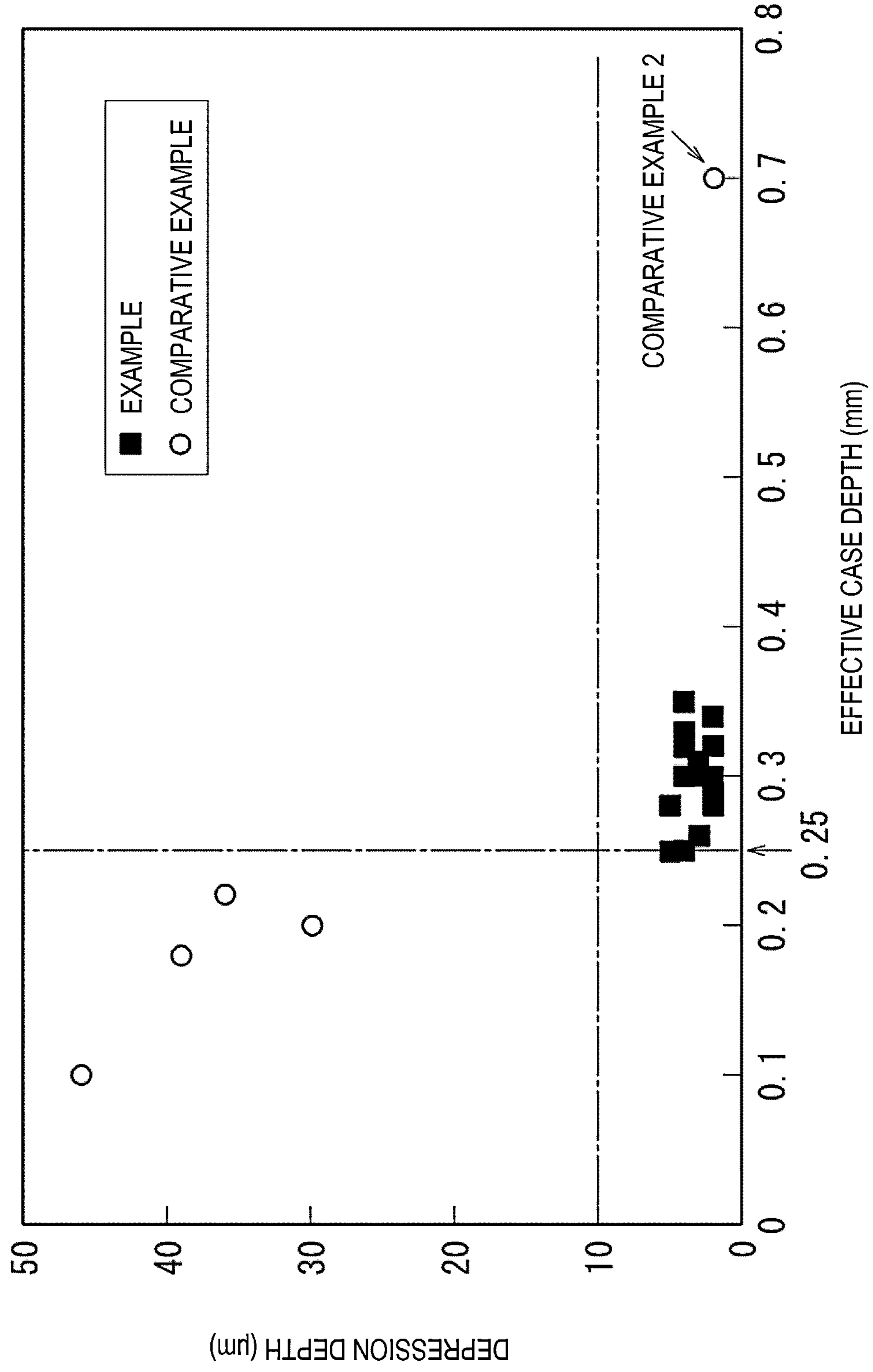
FIG. 7 is a graph showing a relation between the effective case depth and a depression depth.

Next, FIG. 7 is a graph showing a relation between the effective case depth and the depression depth. If the effective case depth is ensured to be 0.25 mm or more, the depression depth can be made less than 10 μm. In other words, it can be seen that even in the case of a nitrided test piece, as long as a steel adjusted to satisfy Formula (2) is used, an internal strength equivalent to that of the carburized Comparative Example 2 can be obtained.

The present application claims a priority of Japanese Patent Application No. 2022-068503 filed with the Japan Patent Office on Apr. 18, 2022, all the contents of which are hereby incorporated by reference.

The invention claimed is:

1. A gear made of a steel having a composition containing, by mass %,

C: 0.31% to 0.35%,
Si: 0.30% or less,
Mn: 0.20% to 0.80%,
P: 0.030% or less,
S: 0.030% or less,
Cu: 0.35% or less,
Ni: 0.25% or less,
Cr: 1.00% to 1.40%,
Mo: 0.95% to 1.10%, and
V: 0.25% to 0.30%, with the balance being Fe and unavoidable impurities, and satisfying the following Formulas (1) and (2), the gear comprising a plurality of teeth configured to be engaged with another member, each of the plurality of teeth comprising a soft-nitrided surface layer, the soft-nitrided surface layer containing a compound layer having a thickness of 5 μm or more and mainly containing an iron nitride, $$3.36\times[Cr]+13.7\times[Mo]+5.59\times[V]>15 \quad \text{Formula (1)}$$

$$1.00\times[C]-0.20\times[Cr]+0.20\times[Mo]+1.00\times[V]-0.26>0.2 \quad \text{Formula (2)}$$

wherein [ ] in Formulas (1) and (2) indicates a content by mass % of each of the elements.

2. The gear according to claim 1, wherein an effective case depth reaching a Vickers hardness of 500 HV is 0.25 mm or more.

3. The gear according to claim 1, wherein the soft-nitrided surface layer further contains a diffusion layer formed directly below the compound layer, wherein nitrogen is diffused into a matrix of the diffusion layer.

* * * * *